United States Patent
Worker

(10) Patent No.: US 10,850,676 B1
(45) Date of Patent: Dec. 1, 2020

(54) AUXILIARY TRUCK BED RACK

(71) Applicant: Michael Worker, Pawnee, IL (US)

(72) Inventor: Michael Worker, Pawnee, IL (US)

( * ) Notice: Subject to any disclaimer, the term of this patent is extended or adjusted under 35 U.S.C. 154(b) by 156 days.

(21) Appl. No.: 16/155,175

(22) Filed: Oct. 9, 2018

(51) Int. Cl.
  *B60R 9/06* (2006.01)
  *B60P 7/15* (2006.01)
  *B62D 33/08* (2006.01)

(52) U.S. Cl.
  CPC .................. *B60R 9/06* (2013.01); *B60P 7/15* (2013.01); *B62D 33/08* (2013.01)

(58) Field of Classification Search
  CPC ......... B60R 9/06; B60P 7/15; B62D 33/0207; B60J 7/102; B60J 7/065; B60J 7/064
  USPC .................... 296/3, 136.03, 160.18
  See application file for complete search history.

(56) References Cited

U.S. PATENT DOCUMENTS

| | | | |
|---|---|---|---|
| D248,228 S | 6/1978 | Robertson | |
| 4,181,351 A | 1/1980 | Spanke | |
| 4,444,427 A | 4/1984 | Martin | |
| 5,427,487 A * | 6/1995 | Brosfske | B60P 7/15 410/121 |
| 5,443,190 A | 8/1995 | Cucheran | |
| 5,741,038 A | 4/1998 | Fowler | |
| 5,871,316 A | 2/1999 | Bills | |
| 5,921,603 A * | 7/1999 | Karrer | B60P 1/54 296/100.17 |
| 5,951,092 A * | 9/1999 | Cissell | B60J 7/102 296/100.12 |
| 6,511,272 B2 * | 1/2003 | Stafford | B60P 7/15 410/121 |
| 6,722,541 B1 * | 4/2004 | Aftanas | B60R 9/00 224/321 |
| 6,843,626 B1 | 1/2005 | Falconer | |
| 7,497,493 B1 * | 3/2009 | Thiessen | B60P 7/15 296/3 |
| 7,823,957 B2 * | 11/2010 | Williamson | B60J 7/104 292/256 |
| 2002/0093216 A1 * | 7/2002 | Ananian | B60P 7/0815 296/100.12 |
| 2006/0208524 A1 * | 9/2006 | Brown | B60J 7/104 296/100.01 |
| 2008/0143133 A1 * | 6/2008 | Nichols | B60P 7/0815 296/3 |

(Continued)

FOREIGN PATENT DOCUMENTS

GB 2422812 6/2008

*Primary Examiner* — Jason S Morrow
(74) *Attorney, Agent, or Firm* — Kyle A. Fletcher, Esq.

(57) ABSTRACT

The auxiliary truck bed rack is an elevated rack system. The auxiliary truck bed rack mounts on the pickup truck such that the auxiliary truck bed rack is elevated above the port sidewall and the starboard sidewall of the pickup truck. The load path provided by the auxiliary truck bed rack adjusts such that the internal strains on the load can be minimized while stored on the auxiliary truck bed rack. The auxiliary truck bed rack comprises a forward crossbeam, one or more middle crossbeams, an aft crossbeam, a port beam, and a starboard beam. The port beam mounts on the port sidewall of the pickup truck. The starboard beam mounts on the starboard sidewall of the pickup truck. The forward crossbeam, the one or more middle crossbeams, and the aft crossbeam are transverse structures that attach to both the port sidewall and the starboard sidewall.

19 Claims, 4 Drawing Sheets

(56) References Cited

U.S. PATENT DOCUMENTS

| | | | |
|---|---|---|---|
| 2010/0096872 A1* | 4/2010 | Brogdon | B60R 9/00 296/3 |
| 2010/0133872 A1* | 6/2010 | Kosinski | B60J 7/104 296/100.09 |
| 2013/0341960 A1* | 12/2013 | Garska | B23P 11/00 296/100.18 |
| 2016/0039274 A1* | 2/2016 | Smith | B60P 7/02 296/100.02 |
| 2018/0111542 A1* | 4/2018 | Mueller | B60R 9/06 |

* cited by examiner

AUXILIARY TRUCK BED RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and land vehicles, more specifically, a superstructure for a load carrying vehicle comprising adjustable means. (B62D33/08)

SUMMARY OF INVENTION

The auxiliary truck bed rack is an elevated rack system. The auxiliary truck bed rack is configured for use with a pickup truck. The pickup truck is further defined with a bed. The bed is further defined with an end wall, a port sidewall, a starboard sidewall, a tailgate. The auxiliary truck bed rack mounts on the pickup truck such that the auxiliary truck bed rack is elevated above the port sidewall and the starboard sidewall of the pickup truck. The auxiliary truck bed rack allows the pickup truck to carry a first load above a second load stored in the bed of the pickup truck. The auxiliary truck bed rack is adjustable. Specifically, the load path provided by the auxiliary truck bed rack adjusts such that the internal strains on the load can be minimized while stored on the auxiliary truck bed rack.

The auxiliary truck bed rack comprises a forward crossbeam, one or more middle crossbeams, an aft crossbeam, a port beam, and a starboard beam. The port beam mounts on the port sidewall of the pickup truck. The starboard beam mounts on the starboard sidewall of the pickup truck. The forward crossbeam, the one or more middle crossbeams, and the aft crossbeam are transverse structures that attach to both the port sidewall and the starboard sidewall. Each of the one or more middle crossbeams further comprises a port T track fastener and a starboard T track fastener. The port T track fastener attaches the associated middle crossbeam to the port beam. The starboard T track fastener attaches the associated middle crossbeam to the starboard beam.

These together with additional objects, features and advantages of the auxiliary truck bed rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary truck bed rack in detail, it is to be understood that the auxiliary truck bed rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary truck bed rack.

It is therefore important that the claims be regarded as including such equivalent construction insofar as they do not depart from the spirit and scope of the auxiliary truck bed rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
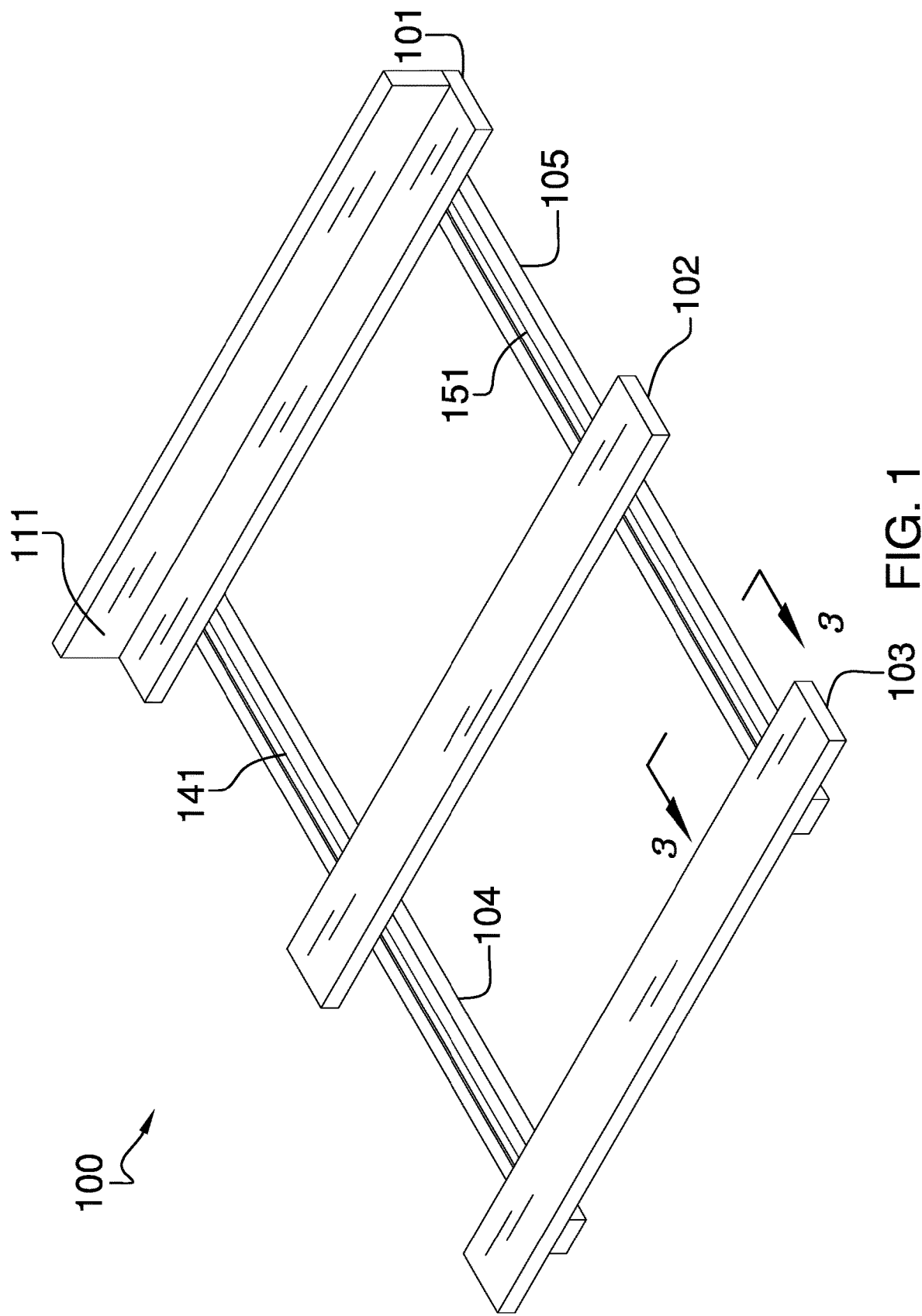
FIG. 1 is a perspective view of an embodiment of the disclosure.
Figure 2:
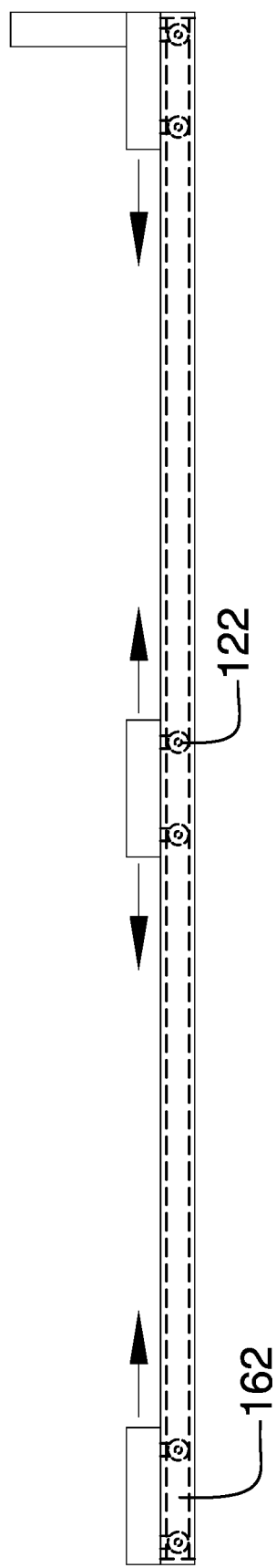
FIG. 2 is a side view of an embodiment of the disclosure.
Figure 3:
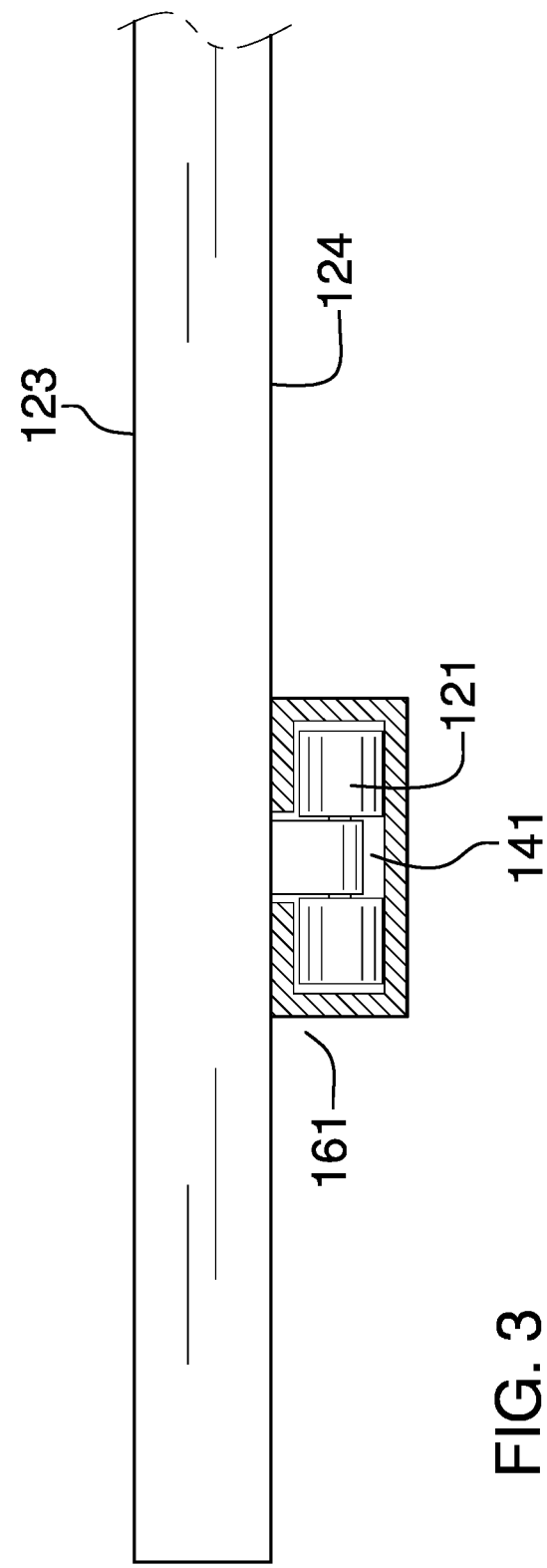
FIG. 3 is a cross-sectional view of an embodiment of the disclosure across 3-3 as shown in FIG. 1.
Figure 4:
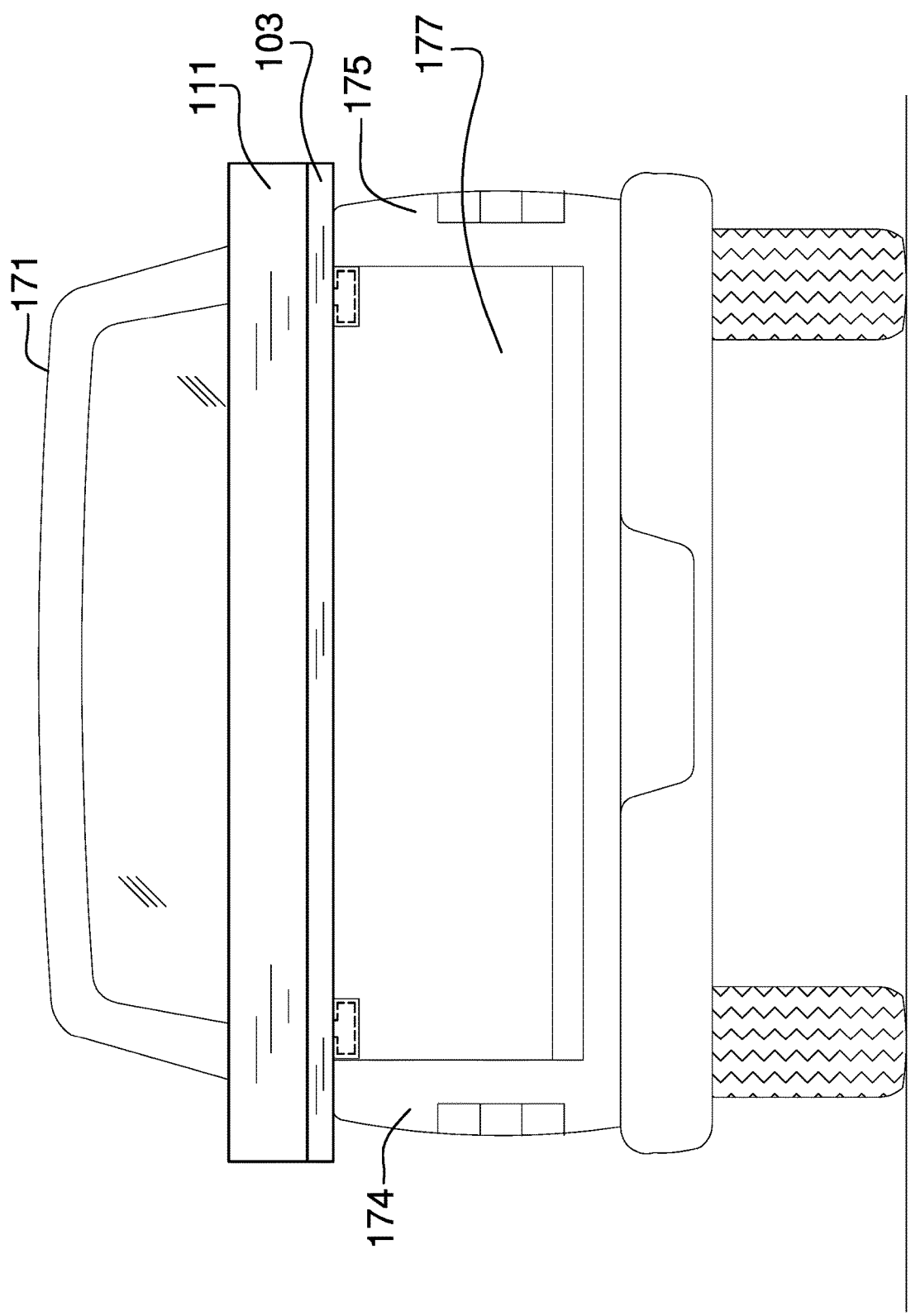
FIG. 4 is a rear view of an embodiment of the disclosure.
Figure 5:
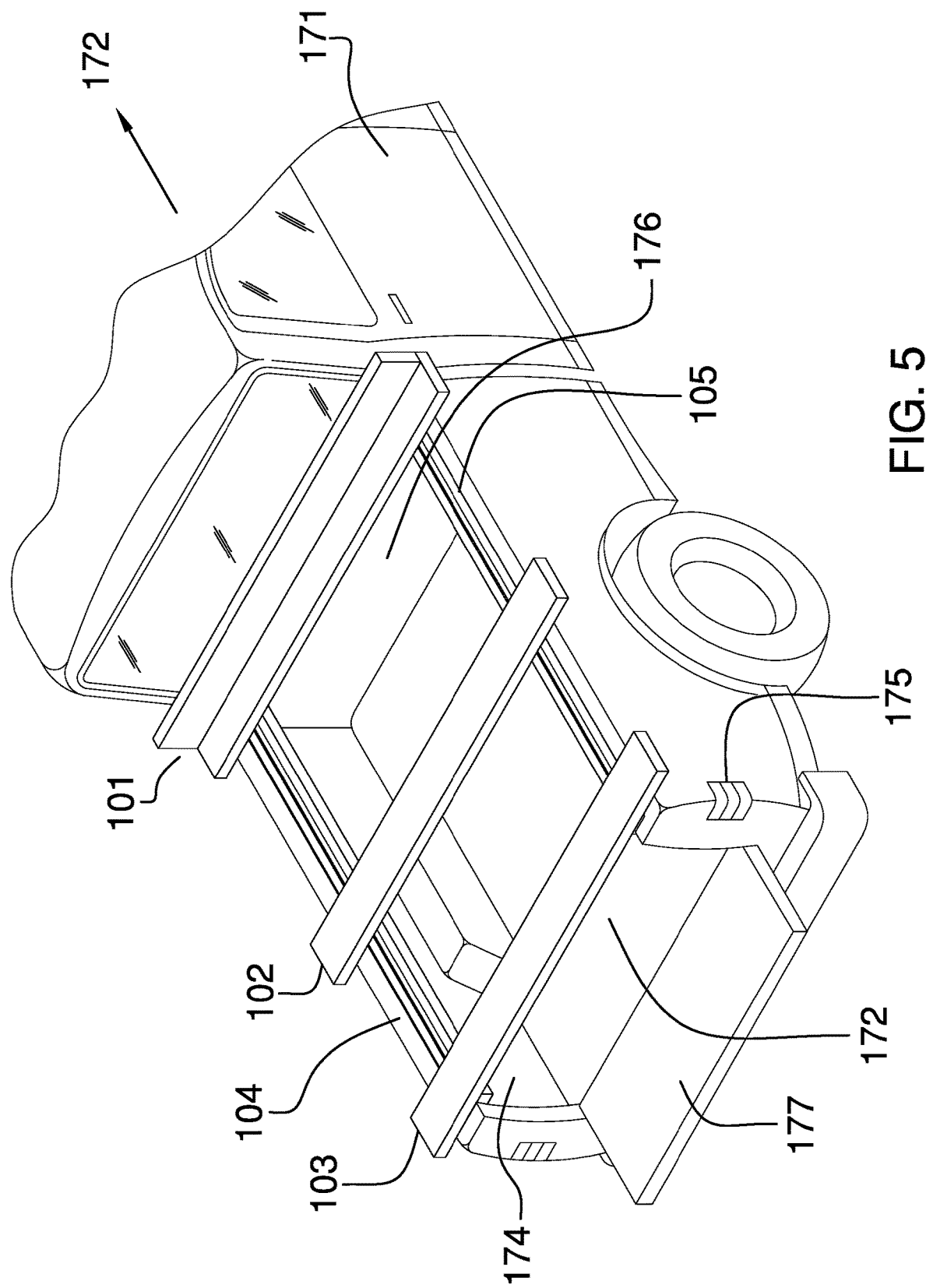
FIG. 5 is an in-use view of an embodiment of the disclosure.

Detailed reference will now be made to one or more potential embodiments of the disclosure, which are illustrated in FIGS. 1 through 5.

The auxiliary truck bed rack 100 (hereinafter invention) is an elevated rack system. The invention 100 is configured for use with a pickup truck 171. The pickup truck 171 is further defined with a bed 173. The bed 173 is further defined with an end wall 176, a port sidewall 174, a starboard sidewall 175, a tailgate 177. The invention 100 mounts on the pickup truck 171 such that the invention 100 is elevated above the port sidewall 174 and the starboard sidewall 175 of the pickup truck 171. The invention 100 allows the pickup truck 171 to carry a first load above a second load stored in the bed 173 of the pickup truck 171. The invention 100 is adjustable. Specifically, the load path provided by the invention 100 adjusts such that the internal strains on the load can be minimized while stored on the invention 100.

The invention 100 comprises a forward crossbeam 101, one or more middle crossbeams 102, an aft crossbeam 103, a port beam 104, and a starboard beam 105. The port beam 104 mounts on the port sidewall 174 of the pickup truck 171. The starboard beam 105 mounts on the starboard sidewall 175 of the pickup truck 171. The forward crossbeam 101, the one or more middle crossbeams 102, and the aft crossbeam 103 are transverse structures that attach to both the port sidewall 174 and the starboard sidewall 175. Each of the one or more middle crossbeams 102 further comprises a port T track fastener 161 and a starboard T track fastener 162. The port T track fastener 161 attaches the associated middle crossbeam to the port beam 104. The starboard T track fastener 162 attaches the associated middle crossbeam to the starboard beam 105.

The pickup truck 171 is defined in greater detail elsewhere in this disclosure. The primary sense of direction 172 is defined in greater detail elsewhere in this disclosure. The bed 173 is a rectangular containment structure that is formed in the aft section of the pickup truck 171. The term bed 173 further refers to the supporting inferior horizontal structure of the containment structure formed by the bed 173. The port sidewall 174 is a vertical barrier that forms the port side of the bed 173. The starboard sidewall 175 is a vertical barrier that forms the starboard side of the bed 173. The end wall 176 is a vertical barrier that forms the forward boundary of the bed 173. The tailgate 177 is a rotating vertical barrier that forms the aft boundary of the bed 173.

The port T track fastener 161 is a well-known and documented adjustable fastening device that attaches a middle crossbeam selected from the one or more middle crossbeams 102 to the port beam 104. The starboard T track fastener 162 is a well-known and documented adjustable fastening device that attaches a middle crossbeam selected from the one or more middle crossbeams 102, to the starboard beam 105. The T track fastener is shown most clearly in FIG. 3 and is defined in greater detail elsewhere in this disclosure.

The forward crossbeam 101 is an aluminum plate structure. The forward crossbeam 101 is a load-bearing structure. The forward crossbeam 101 has the shape of a rectangular block. The forward crossbeam 101 is a transverse beam that attaches the port beam 104 to the starboard beam 105. The forward crossbeam 101 mounts to the pickup truck 171 proximal to the end wall 176. The forward crossbeam 101 does not move relative to the end wall 176. The major axis of the forward crossbeam 101 is perpendicular to the primary sense of direction 172 of the pickup truck 171. The forward crossbeam 101 further comprises a bumper plate 111.

The bumper plate 111 is an aluminum plate structure. The bumper plate 111 has a vertical orientation. The bumper plate 111 forms a barrier between the load stored on the invention 100 and the pickup truck 171 such that a shift in the position of the load during the braking of the pickup truck 171 will not damage the pickup truck 171.

Each of the one or more middle crossbeams 102 is identical. Each of the one or more middle crossbeams 102 is an aluminum plate structure. The one or more middle crossbeams 102 is a load-bearing structure. Each of the one or more middle crossbeams 102 has the shape of a rectangular block. Each of the one or more middle crossbeams 102 is a transverse beam that attaches the port beam 104 to the starboard beam 105. The major axis of each of the one or more middle crossbeams 102 is perpendicular to the primary sense of direction 172 of the pickup truck 171.

Each of the one or more middle crossbeams 102 attaches to the port beam 104 such that the position of the each of the one or more middle crossbeams 102 adjusts relative to the port beam 104. Each of the one or more middle crossbeams 102 attaches to the starboard beam 105 such that the position of the each of the one or more middle crossbeams 102 adjusts relative to the starboard beam 105.

Each of the one or more middle crossbeams 102 further comprises a port rail 121 and a starboard rail 122. Each of the one or more middle crossbeams 102 is further defined with a superior face 123 and an inferior face 124. On each of the one or more middle crossbeams 102, the port rail 121 is identical to the starboard rail 122.

The superior face 123 of each of the one or more middle crossbeams 102 is the face that is proximal to the supported load when the invention 100 is normally used. The inferior face 124 of each of the one or more middle crossbeams 102 is the face that is proximal to the pickup truck 171 when the invention 100 is normally used. The inferior face 124 is distal from the superior face 123.

The port rail 121 is a rolling structure that attaches to each of the one or more middle crossbeams 102. The port rail mounts on the inferior face 124 of the associated middle crossbeam. The port rail 121 comprises two wheels that insert into the port channel 141 of the port beam 104. The port rail 121 and the port channel 141 combine to form the port T track fastener 161. In the first potential embodiment of the disclosure, the port rail 121 comprises two wheels each of which attach to a cantilever using a rolling bearing element. This arrangement allows the associated middle crossbeam to roll freely along the major axis of the port beam 104.

The port T track fastener 161 associated with each of the one or more middle crossbeams 102 comprises the port rail 121 and the port channel 141.

The starboard rail 122 is a rolling structure that attaches to each of the one or more middle crossbeams 102. The starboard rail 122 mounts on the inferior face 124 of the associated middle crossbeam. The starboard rail 122 comprises two wheels that insert into the starboard channel 151 of the starboard beam 105. The starboard rail 122 and the starboard channel 151 combine to form the starboard T track fastener 162. In the first potential embodiment of the disclosure, the starboard rail 122 comprises two wheels each of which attach to a cantilever using a rolling bearing element. This arrangement allows the associated middle crossbeam to roll freely along the major axis of the starboard beam 105.

The starboard T track fastener 162 associated with each of the one or more middle crossbeams 102 comprises the starboard rail 122 and the starboard channel 151.

The aft crossbeam 103 is an aluminum plate structure. The aft crossbeam 103 is a load-bearing structure. The aft crossbeam 103 has the shape of a rectangular block. The aft crossbeam 103 is a transverse beam that attaches the port beam 104 to the starboard beam 105. The aft crossbeam 103 mounts to the pickup truck 171 proximal to the tailgate 177. The aft crossbeam 103 does not move relative to the tailgate 177. The major axis of the aft crossbeam 103 is perpendicular to the primary sense of direction 172 of the pickup truck 171.

The port beam 104 is an aluminum plate structure. The port beam 104 is a load-bearing structure. The port beam 104 has the shape of a rectangular block. The port beam 104 is a beam that attaches to the superior edge of the port sidewall 174 of the pickup truck 171. The major axis of the port beam 104 is parallel to the primary sense of direction 172 of the pickup truck 171.

The port beam 104 further comprises a port channel 141. The port channel 141 is a negative space formed in the superior surface of the port beam 104. The port channel 141 is a tee shaped structure. The port channel 141 runs in a direction parallel to the major axis of the port beam 104. The port channel 141 forms the channel structure of the port T track fastener 161. The port channel 141 forms a slot in the superior face 123 of the port beam 104.

The starboard beam 105 is an aluminum plate structure. The starboard beam 105 is a load-bearing structure. The starboard beam 105 has the shape of a rectangular block. The starboard beam 105 is a beam that attaches to the superior edge of the starboard sidewall 175 of the pickup truck 171. The major axis of the starboard beam 105 is parallel to the primary sense of direction 172 of the pickup truck 171.

The starboard beam 105 further comprises a starboard channel 151. The starboard channel 151 is a negative space formed in the superior surface of the starboard beam 105. The starboard channel 151 is a tee shaped structure. The starboard channel 151 runs in a direction parallel to the major axis of the starboard beam 105. The starboard channel 151 forms the channel structure of the starboard T track fastener 162. The starboard channel 151 forms a slot in the superior face 123 of the starboard beam 105.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles. See bow, forward, port, starboard, and stern Anterior: As used in this disclosure, anterior is a term that is used to refer to the front side or direction of a structure. When comparing two objects, the anterior object is the object that is closer to the front of the structure.

Beam: As used in this disclosure, a beam is a horizontally oriented load bearing structure.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Bow: As used in this disclosure, the bow refers to the anterior side of a vehicle or vessel. See aft, forward, port, starboard, and stern Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a port sidewall, a starboard sidewall, and an end wall.

Port: As used in this disclosure, port refers to the left side of a vehicle when a viewer is facing towards the primary sense of direction of the vehicle. See bow, forward, aft, starboard, and stern Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Rack: As used in this disclosure, a rack is a structure that holds or supports an object in a visible or exposed manner.

Radial: As used in this disclosure, the term radial refers to a direction that: 1) is perpendicular to an identified central axis; or, 2) projects away from a center point.

Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Rolling Element Bearing: As used in this disclosure, a rolling element bearing comprises is a type of bearing comprising an inner race, an outer race, and a plurality of ball bearings. The plurality of ball bearings are sphere shaped. The inner race is a circular ring. The outer race is a circular ring with an inner diameter that is greater than the outer diameter of the inner race. The plurality of ball bearings are placed between the inner race and the outer race such that: 1) the inner race and the outer race are coaxially positioned; and, 2) the inner race rotates relative to the outer race. Typically, the inner race attaches to a first object and the outer race attaches to a second object such that the first object rotates relative to the second object. Typically, a rolling element bearing is disk-shaped. A rolling element bearing is said to be "locking" when the relative position of the inner race in being locked into a fixed position relative to the outer race. Rolling element bearings, including locking versions, are: 1) commercially available; and, 2) well-known and documented in the mechanical arts.

Rounded: A used in this disclosure, the term rounded refers to the replacement of an apex, vertex, or edge or brink of a structure with a (generally smooth) curvature wherein the concave portion of the curvature faces the interior or center of the structure.

Starboard: As used in this disclosure, starboard refers to the right side of a vehicle when a viewer is facing towards the primary sense of direction of the vehicle.

Stern: As used in this disclosure, the stern refers to the aft or posterior side of a vehicle or vessel.

Superior: As used in this disclosure, the term superior refers to a directional reference that is parallel to and in the opposite direction of the force of gravity when an object is positioned or used normally.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail inserts into the channel.

Tailgate: As used in this disclosure, a tailgate is a hinged door mounted on the rear of a pickup truck that can be lowered or removed in order to facilitate loading of the pickup truck.

Tee Shape: As used in this disclosure, the term see shape refers to a structure formed from a cross prism and a cantilever prism wherein the cantilever prism attaches to the cross prism such that: a) the cantilever prism attaches to the cross prism in the manner of a cantilever; and, b) the center axis of the cantilever prism intersects with a projects radially away from the center point of the center axis of the cross prism.

Transverse: As used in this disclosure, transverse refers to a first structure that: a) attaches to a second structure such that the first structure is perpendicular to the major axis or primary sense of direction of the second structure; or, 2) joins a second structure to a third structure such that the first structure bridges a gap between the second structure and the third structure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle superstructure comprising:
a forward crossbeam, one or more middle crossbeams, an aft crossbeam, a port beam, and a starboard beam;
wherein the forward crossbeam, the one or more middle crossbeams, and the aft crossbeam are structures that attach to both a port sidewall and a starboard sidewall;
wherein the vehicle superstructure is an elevated rack system;
wherein the vehicle superstructure is configured for use with a pickup truck;
wherein the pickup truck is further defined with a bed;
wherein the pickup truck is further defined with a primary sense of direction;
wherein the bed is further defined with an end wall, a port sidewall, a starboard sidewall, a tailgate;
wherein the vehicle superstructure mounts on the pickup truck such that the vehicle superstructure is elevated above the port sidewall and the starboard sidewall of the pickup truck;
wherein the vehicle superstructure is adjustable;
wherein the port beam mounts on the port sidewall of the pickup truck;
wherein the starboard beam mounts on the starboard sidewall of the pickup truck;

wherein the port beam further comprises a port channel;
wherein the port channel is a negative space formed in a superior surface of the port beam;
wherein the starboard beam further comprises a starboard channel;
wherein the starboard channel is a negative space formed in a superior surface of the starboard beam.

2. The vehicle superstructure according to claim 1 wherein each of the one or more middle crossbeams further comprises a port T track fastener and a starboard T track fastener;
wherein each port T track fastener attaches the associated middle crossbeam to the port beam;
wherein each starboard T track fastener attaches the associated middle crossbeam to the starboard beam.

3. The vehicle superstructure according to claim 2 wherein the forward crossbeam is an aluminum plate structure;
wherein the aft crossbeam is an aluminum plate structure;
wherein the forward crossbeam is a load-bearing structure;
wherein the aft crossbeam is a load-bearing structure;
wherein the forward crossbeam has the shape of a rectangular block;
wherein the aft crossbeam has the shape of a rectangular block.

4. The vehicle superstructure according to claim 3 wherein the forward crossbeam is a transverse beam that attaches the port beam to the starboard beam;
wherein the aft crossbeam is a transverse beam that attaches the port beam to the starboard beam;
wherein the forward crossbeam mounts to the pickup truck at the end wall;
wherein the aft crossbeam mounts to the pickup truck at the tailgate.

5. The vehicle superstructure according to claim 4 wherein a major axis of the forward crossbeam is perpendicular to the primary sense of direction of the pickup truck;
wherein a major axis of the aft crossbeam is perpendicular to the primary sense of direction of the pickup truck;
wherein the forward crossbeam does not move relative to the end wall;
wherein the aft crossbeams does not move relative to the tailgate.

6. The vehicle superstructure according to claim 5 wherein each of the one or more middle crossbeams is an aluminum plate structure;
wherein the one or more middle crossbeams is a load-bearing structure;
wherein each of the one or more middle crossbeams has the shape of a rectangular block.

7. The vehicle superstructure according to claim 6 wherein each of the one or more middle crossbeams is identical.

8. The vehicle superstructure according to claim 7 wherein each of the one or more middle crossbeams is a transverse beam that attaches the port beam to the starboard beam;
wherein a major axis of each of the one or more middle crossbeams is perpendicular to the primary sense of direction of the pickup truck.

9. The vehicle superstructure according to claim 8 wherein each of the one or more middle crossbeams attaches to the port beam such that the position of the each of the one or more middle crossbeams adjusts relative to the port beam;
wherein each of the one or more middle crossbeams attaches to the starboard beam such that the position of the each of the one or more middle crossbeams adjusts relative to the starboard beam.

10. The vehicle superstructure according to claim 9 wherein the port beam is an aluminum plate structure;
wherein the port beam is a load-bearing structure;
wherein the port beam has the shape of a rectangular block;
wherein the port beam is a beam that attaches to a superior edge of the port sidewall of the pickup truck;
wherein the starboard beam is an aluminum plate structure;
wherein the starboard beam is a load-bearing structure;
wherein the starboard beam has the shape of a rectangular block;
wherein the starboard beam is a beam that attaches to a superior edge of the starboard sidewall of the pickup truck.

11. The vehicle superstructure according to claim 10 wherein a major axis of the port beam is parallel to the primary sense of direction of the pickup truck;
wherein a major axis of the starboard beam is parallel to the primary sense of direction of the pickup truck.

12. The vehicle superstructure according to claim 11 wherein the port channel is a tee shaped structure;
wherein the starboard channel is a tee shaped structure.

13. The vehicle superstructure according to claim 12 wherein the port channel runs in a direction parallel to a major axis of the port beam;
wherein the starboard channel runs in a direction parallel to a major axis of the starboard beam.

14. The vehicle superstructure according to claim 13 wherein the port channel forms a slot in a superior face of the port beam;
wherein the starboard channel forms a slot in a superior face of the starboard beam.

15. The vehicle superstructure according to claim 14 wherein the forward crossbeam further comprises a bumper plate;
wherein the bumper plate is an aluminum plate structure;
wherein the bumper plate has a vertical orientation;
wherein the bumper plate forms a barrier between the vehicle superstructure and the pickup truck.

16. The vehicle superstructure according to claim 15 wherein each of the one or more middle crossbeams further comprises a port rail and a starboard rail;
wherein each of the one or more middle crossbeams is further defined with a superior face and an inferior face;
wherein the port rail is a rolling structure;
wherein the starboard rail is a rolling structure.

17. The vehicle superstructure according to claim 16 wherein for each of the one or more middle crossbeams the port rail is identical to the starboard rail.

18. The vehicle superstructure according to claim 17 wherein the port rail mounts on the inferior face of the associated middle crossbeam;
wherein the starboard rail mounts on the inferior face of the associated middle crossbeam;
wherein the port rail inserts into the port channel of the port beam;
wherein the starboard rail inserts into the starboard channel of the starboard beam.

19. The vehicle superstructure according to claim 18 wherein the port T track fastener associated with each of the one or more middle crossbeams comprises the port rail and the port channel;

wherein the starboard T track fastener associated with each of the one or more middle crossbeams comprises the starboard rail and the starboard channel.

\* \* \* \* \*